United States Patent Office 3,520,185
Patented July 14, 1970

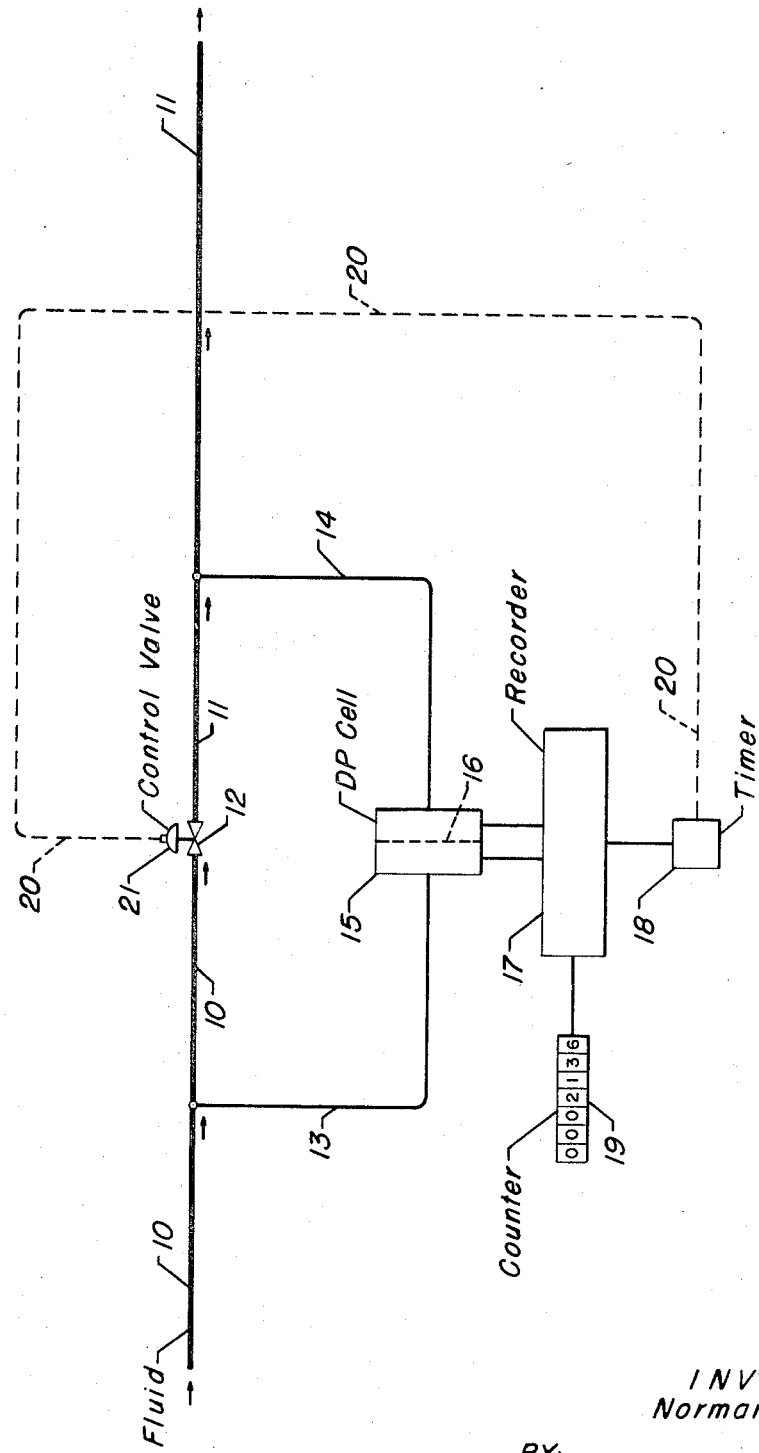

3,520,185
FLOW METERING SYSTEM
Norman H. Scott, Villa Park, Ill., assignor to Universal Oil Products Company, Des Plaines, Ill., a corporation of Delaware
Filed Nov. 21, 1967, Ser. No. 684,691
Int. Cl. G01f 3/20
U.S. Cl. 73—269        1 Claim

ABSTRACT OF THE DISCLOSURE

Flow metering system particularly adaptable for measuring relatively small flow rates which utilizes a differential pressure cell, a timing device, and a control valve for obtaining displacement versus time data which is then correlated with flow rate. The displacement is obtained by the deflection of the flexible diaphragm in the differential pressure cell during a relatively short period of time when flow is stopped in the primary conduit by closing the control valve.

BACKGROUND OF THE INVENTION

The present invention relates to a flow metering system. It particularly relates to a system for measuring the rate of flow of a fluid medium, such as a liquid, by determining a displacement versus time factor in a differential pressure cell.

It is known in the art that various instruments are satisfactory for the determination of flow measurements. Generally, these instruments include head flow meters, area flow meters, positive displacement meters, weirs and flumes, and mass and magnetic flow meters. For use in the chemical and process industries of commercial size, those skilled in the art utilize either the head flow meter or the positive displacement meter. The head flow meter requires the production of some form of restriction in the flow line to induce a head with a secondary element connected to the differential head for correlating the differential head developed with flow rate. Such a prior art restriction would include orifice assemblies of various designs.

However, in service for the measurement of relatively small flow quantities, such as would be used in laboratory or pilot plant operations, the design of head and/or positive displacement flow meters presents unique problems. By far the most prevalent problem in the use of orifice assemblies for the measurement of relatively small flow rates is that the design of the orifice edge with respect to orifice diameter is particularly critical and very little experimental work has been performed on these designs to permit widespread use having satisfactory results. In addition, the Reynolds Numbers encountered in pilot plant operations are frequently in the low range, thereby placing an orifice assembly in an unstable environment such that the coefficient of discharge is significantly affected by relatively small changes in Reynolds Numbers.

Recently the petroleum industry has become interested in upgrading relatively heavy petroleum oils, commonly called "black oils" into more valuable products through such means as hydrocracking. Therefore, the experimental development work, such as pilot plant operation, has been handling fluids which are notably black in color, highly viscous, and in some instances, unusually corrosive. In order to overcome the above mentioned deficiencies in orifice assembly measuring devices, those skilled in the art have frequently used displacement-type devices which operate on the principle of displacing of, for example, mercury in a glass container and observing the time required for the mercury to rise to a predetermined level. In the handling of black oils, however, the utilization of visual observation in a glass device became virtually impossible due to the fact that the black oil so clouded the glass surface that the level could not be accurately observed.

SUMMARY OF THE INVENTION

Therefore, it is an object of this invention to provide an improved flow metering system.

It is another object of this invention to provide an improved flow metering system for use in measuring flow rates in a relatively low range.

It is still another object of this invention to provide an improved flow metering system which operates in a facile manner such that flow measurements can be obtained without interrupting the processing scheme within which such flow is being determined.

According to the present invention there is provided an improved flow metering system comprising, in combination, conduit for the passage of fluid therethrough; valve means located in said conduit; differential pressure means comprising first lead means having open communication with said conduit at a locus upstream of said valve, second lead means having open communication with said conduit at a locus downstream of said valve, said first and second lead means being separated by impervious flexible diaphragm means and said differential pressure means being so arranged with said conduit such that said first and second lead means are filled with the fluid passing through said conduit; annd readout means cooperatively connected to said differential pressure means for representing the rate of flow of fluid.

Another embodiment of this invention includes the system hereinabove wherein said readout means contains means for measuring the time required for the differential pressure across said diaphragm to reach a predetermined level.

Thus, the essence of the present invention as seen from the embodiments hereinabove includes a diaphragm differential pressure transmitter which is installed in a line transferring any fluid to be measured. In operation, the control valve is closed causing the fluid to accumulate on one side of the diaphragm. As the differential pressure increases, an equal volume of fluid is displaced from the downstream side of the diaphragm in the pressure transmitter. Thus, as far as the system is concerned, flow is not interrupted to take this measurement.

In a preferred embodiment of the invention, time is observed for a given amount of differential pressure deflection. Associated with the timing device can be a counting device which would count the number of cycles through which the differential pressure cell deflection is measured. For example, a complete cycle would include closing of the valve, measuring the increase in pressure to a predetermined level, opening the valve, and then allowing a fixed time to elapse for repositioning of the pressure sensing element. Various means can be used for completing this cycle of operation, such as automatic solenoid valves, computer operation or even manual operation combined with visual determination of the increase in pressure versus time relationship on, say, a strip chart recorder. The calibration of the flow metering system can, of course, be based on any number of parameters. For example, a calibration could be made on flow rate versus number of cycles per hour which the system would go through.

In a preferred embodiment of this invention and a best mode of operation, the calibration is based upon flow rate, such as cubic centimeters per hour versus cycles per hour. When using this calibration it is recommended that the differential pressure cell and other hardware be sized so that 100 to 150 cycles per hour could be obtained. On the other hand, the size of the differential pressure cell and transmitter should be such that a complete cycle could be obtained in from 1 to 2 seconds up to, say, 3 to 5 minutes in time.

The invention may be more fully understood with reference to the appended drawing which is a schematic representation of one embodiment of the present invention.

DESCRIPTION OF THE DRAWING

With reference to the drawing, the flow metering system includes inlet conduit 10, outlet conduit 11, having control valve 12 therebetween. Differential pressure (DP) cell 15 containing impervious flexible diaphragm 16 is placed in usual arrangement across valve 12 by upstream lead 13 and downstream lead 14. Readout means cooperatively connected to the differential pressure cell (which also contains suitable transmitter means) include pressure recorder 17 having limit contact points and having strip chart-pen means movable in a time related fashion, not shown. Connected to the limit contact points of recorder 17 may also be connected counting device 19 which could be visually read and which is activated each time the upper limit contact points on recorder 17 are reached. Timing device 18, which may be a conventional clock means, is also connected with recorder 17 and in this embodiment is utilized to activate control valve 12 by pneumatic means 21 for opening and closing valve 12 in accordance with the practice of the present invention. Lead 20 represents the connection between timing device 18 and pneumatic means 21 for activating control valve 12.

In operating the flow metering system illustrated in the attached drawing, a pulsating pump which is frequently used to transfer fluids in the flow range from, say, 10 cc./hour to 1000 cc./hour, is utilized to introduce liquid into the system via line 10. Valve 12 being in an open position, the fluid exits from the system via line 11. On a programmed signal, control valve 12 closes through pneumatic means 21. With valve 12 closed, the fluid in first lead 13 is forced against diaphragm 16 in DP cell 15, causing diaphragm 16 to deflect, thereby displacing an equal volume of fluid which is in second lead 14. Differential cell 15 may be of the conventional type and it is not uncommon for the maximum volume displacement to be obtainable from such cell to be in the range from 1 to 3 cc's. The increase in differential pressure is transmitted by means not shown into pressure recorder 17. Appropriate pen means, also not shown, records the increase in pressure in step fashion according to the pulsations of the feed pump. As the pressure increases, the pen deflection of recorder 17 will ultimately contact limit switches which may be placed in recorder 17. The limit switch would then activate timer 18 and would also signal pneumatic means 21 using lead 20 for opening valve 12. After the timer had completed its delay function, i.e., the preset time had elapsed, it would trigger pneumatic means 21 to close valve 12. The contacting of the limit switch in recorder 17 can be used as a signal to trigger counting device 19 which would indicate the completion of one cycle. The preferred use of a timing device is to provide sufficient lapse time for the pressure sensing element to reposition itself. Generally, the limit switch mechanism on the recorder means provides sufficient means for opening and closing the valve means. Other means now known to those skilled in the art may be used for activating the control valve 12. If a pulsating pump is used it would be desirable to size the system so that at least 5 steps would be obtained and shown on the chart or recorder 17 by the limit switches in recorder 17. Typically, there should be from 20 to 30 steps per cycle if a pulsating pump is used.

The flow metering system illustrated in the attached drawing should be so constructed with respect to the conduit 10 and 11 such that leads 13 and 14 are always filled with the liquid which is flowing in the conduit. Even though the system has been advantageously described for measuring the flow of the liquid in a conduit, the system can also be adapted for the measurement of flow of a gas. However, if gas flow is to be measured, suitable means known to those skilled in the art should be utilized to minimize flow irregularities due to compression of the gas when the control valve is closed.

The concept of the present invention may be modified in various ways. For example, a plurality (e.g., two) of units may be used in parallel operation to reduce flow variations during the time lapse generally associated with repositioning of the pressure sensing element.

I claim:

1. In a flow metering system for measuring relatively small flow rates of the order of from about 10 cc./hr. to about 1,000 cc./hr., the combination comprising: a conduit for the passage of fluid therethrough, a single valve means located in said conduit, differential pressure means comprising first lead means having open communication with said conduit at a locus upstream of said valve, a second means having open communication with said conduit at a second locus downstream of said valve, said first and second lead means being separated by an impervious flexible diaphragm means, said differential pressure means being so arranged with said conduit such that said first and said second lead means are filled with the fluid passing through said conduit, read-out means cooperatively connected to said differential pressure means adapted to represent the rate of flow of said fluid, said read-out means having timing means in association therewith for measuring the time required for the differential pressure across said diaphragm to reach a predetermined level, said valve means having means associated therewith for opening and closing said valve, said read-out means actuating said means to open said valve in response to said diaphragm sensing said predetermined differential pressure, and actuating said means to close said valve a predetermined time later in order to permit said differential pressure means sufficient time lapse to reposition itself.

References Cited

UNITED STATES PATENTS

| | | | |
|---|---|---|---|
| 2,074,950 | 3/1937 | Wallace et al. | 73—194 |
| 2,104,373 | 1/1938 | McNeil et al. | 73—194 |
| 2,892,346 | 6/1959 | Sargent | 73—239 XR |
| 3,098,385 | 7/1963 | Deming | 73—270 |

JAMES J. GILL, Primary Examiner